United States Patent
Döbele et al.

(10) Patent No.: US 7,584,039 B2
(45) Date of Patent: Sep. 1, 2009

(54) METHOD AND DEVICE FOR THE CONTROL OF STARTING DRIVING OR SWITCHING PROCESSES ON A MOTOR VEHICLE

(75) Inventors: Bernd Döbele, Salem (DE); Norbert Wiencek, Hagnau (DE)

(73) Assignee: ZF Friedrichshafen AG, Friedrichshafen (DE)

(*) Notice: Subject to any disclaimer, the term of this patent is extended or adjusted under 35 U.S.C. 154(b) by 624 days.

(21) Appl. No.: 10/590,540

(22) PCT Filed: Jan. 28, 2005

(86) PCT No.: PCT/EP2005/000818

§ 371 (c)(1),
(2), (4) Date: Aug. 25, 2006

(87) PCT Pub. No.: WO2005/084994

PCT Pub. Date: Sep. 15, 2005

(65) Prior Publication Data

US 2007/0135263 A1 Jun. 14, 2007

(30) Foreign Application Priority Data

Feb. 26, 2004 (DE) .................. 10 2004 009 233

(51) Int. Cl.
*G06F 7/00* (2006.01)
*G06F 17/00* (2006.01)

(52) U.S. Cl. .............. 701/53; 477/70; 477/86; 192/3.51; 180/336; 701/51

(58) Field of Classification Search .......... 701/51, 701/53; 477/70, 86; 192/3.51; 180/336
See application file for complete search history.

(56) References Cited

U.S. PATENT DOCUMENTS 3,298,251 A * 1/1967 Moss .................. 475/77

(Continued)

FOREIGN PATENT DOCUMENTS

DE 40 12 595 A1 10/1991

(Continued)

OTHER PUBLICATIONS

Dynamic modeling and control of hybrid electric vehicle powertrain systems; Powell, B.K.; Bailey, K.E.; Cikanek, S.R.; Control Systems Magazine, IEEE; vol. 18, Issue 5, Oct. 1998 pp. 17-33; Digital Object Identifier 10.1109/37.722250.*

(Continued)

*Primary Examiner*—Cuong H Nguyen
(74) *Attorney, Agent, or Firm*—Davis & Bujold, P.L.L.C.

(57) ABSTRACT

A method and a device for controlling starting, driving and shifting processes of a motor vehicle with a drive motor (2) and a gearshift (6), which can be brought into effective drive connection with one another using a starting and shifting clutch (4), with a clutch actuation device (25, 26) as well as with a control apparatus (13) which stands in connection with a power element of the same for controlling the power of the drive motor (2), and which is connected using signal engineering with sensors (14, 17, 19, 21) which ascertain an accelerator deflection angle (A), a motor rotational speed (C) and a transmission input shaft rotational speed (E).

15 Claims, 2 Drawing Sheets

U.S. PATENT DOCUMENTS

| | | | | |
|---|---|---|---|---|
| 4,481,844 | A | * | 11/1984 | Ironside et al. .............. 477/37 |
| 5,146,812 | A | * | 9/1992 | Nikolaus et al. .............. 477/68 |
| 5,620,391 | A | | 4/1997 | Wright |
| 5,911,645 | A | * | 6/1999 | Wontner et al. .............. 477/69 |
| 5,980,410 | A | * | 11/1999 | Stemler et al. ................ 475/5 |
| 5,980,411 | A | * | 11/1999 | Wontner ...................... 475/76 |
| 6,033,342 | A | | 3/2000 | Steinel |
| 6,345,221 | B2 | * | 2/2002 | Hattori et al. ................ 701/51 |
| 6,575,872 | B2 | * | 6/2003 | Gluck et al. ................ 477/68 |
| 2001/0010029 | A1 | * | 7/2001 | Hattori et al. ................ 701/51 |
| 2006/0154783 | A1 | * | 7/2006 | Petzold et al. .............. 477/107 |
| 2007/0135263 | A1 | * | 6/2007 | Dobele et al. .............. 477/110 |

FOREIGN PATENT DOCUMENTS

| | | | |
|---|---|---|---|
| DE | 198 06 497 A1 | | 8/1999 |
| DE | 695 23 834 T2 | | 6/2002 |
| EP | 0 130 794 A1 | | 1/1985 |
| EP | 0 160 368 A1 | | 11/1985 |
| EP | 0 390 423 A1 | | 10/1990 |
| EP | 0 947 372 A2 | | 10/1999 |
| EP | 1 070 625 A2 | | 1/2001 |
| EP | 1 243 458 A2 | | 9/2002 |
| EP | 1 288 059 A2 | | 3/2003 |
| EP | 1 428 716 A2 | | 6/2004 |
| GB | 2 243 655 A | | 11/1991 |
| JP | 60030447 A | * | 2/1985 |
| JP | 01092550 A | * | 4/1989 |
| JP | 02245439 A | * | 10/1990 |
| JP | 05052133 A | * | 3/1993 |
| JP | 09324662 A | * | 12/1997 |
| JP | 2000104594 A | * | 4/2000 |
| JP | 2000110654 A | * | 4/2000 |

OTHER PUBLICATIONS

Active steering unit with integrated ACC for X-by-wire vehicles using a joystick as H.M.I; Kelber, C.R.; Webber, W.; Gomes, G.K.; Lohmann, M.A.; Rodrigues, M.S.; Ledur, D.; Intelligent Vehicles Symposium, 2004 IEEE; Jun. 14-17, 2004 pp. 173-177; Digital Object Identifier 10.1109/IVS.2004.1336376.*

Designing parallel hybrid electric vehicles using V-ELPH 2.01; Rahman, Z.; Butler, K.L.; Ehsani, M.; American Control Conference, 1999. Proceedings of the 1999; vol. 4, Jun. 2-4, 1999 pp. 2693-2697 vol. 4; Digital Object Identifier 10.1109/ACC.1999.786559.*

Parallel hybrid electric vehicle dynamic model and powertrain control; Cikanek, S.R.; Bailey, K.E.; Powell, B.K.; American Control Conference, 1997. Proceedings of the 1997; vol. 1, Jun. 4-6, 1997 pp. 684-688 vol. 1; Digital Object Identifier 10.1109/ACC.1997.611888.*

The application of hardware-in-the-loop on the hybrid power system's simulation; Xing Jie; He Hong-wen; Vehicle Power and Propulsion Conference, 2008. VPPC '08. IEEE; Sep. 3-5, 2008 pp. 1-4; Digital Object Identifier 10.1109/VPPC.2008.4677646.*

V. H. Johnson, K. B. Wipke, and D. J. Rausen, "HEV Control Strategy for Real-Time Optimization of Fuel Economy and missions," Proc. of Future Car Congress 2000, Washington, D C, Apr. 2000.*

J. Xinchao, A. Guoqiang, Z. Jianxin, Y. Lin, and Z. Bin, "The Development of Hardware-in-the-loop Simulation System of Hybrid Vehicle," Vehicle Engine, 2006.*

W. Xiaoming, C. Xi, Z. Chunming, and W. Zhixin, "Development and Research on a Hardware-in-the-loop Simulation System for HEV Powertrain," Automotive Engineering, 2006, 3.*

* cited by examiner

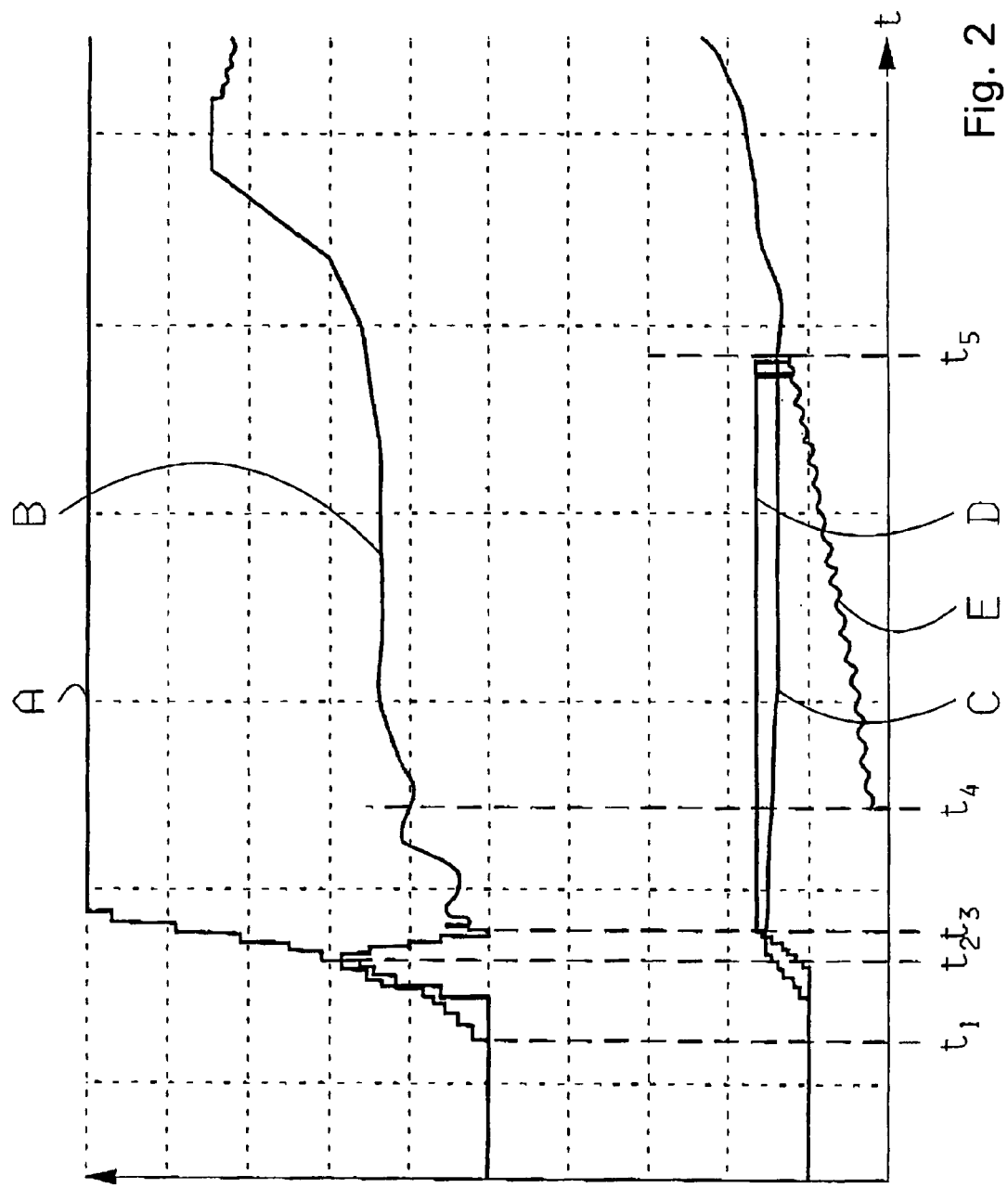

METHOD AND DEVICE FOR THE CONTROL OF STARTING DRIVING OR SWITCHING PROCESSES ON A MOTOR VEHICLE

This application is a national stage completion of PCT/EP2005/000818 filed Jan. 28, 2005 which claims priority from German Application Serial No. 10 2004 009 233.8 filed Feb. 26, 2004.

FIELD OF THE INVENTION

The invention concerns a method and a device for controlling starting, driving and shifting processes of a motor vehicle.

BACKGROUND OF THE INVENTION

It is generally known in specialist circles that with motor vehicles with manually actuated starting and shifting, increased wear and tear of the clutch disk can occur if the driver generates an improperly high motor rotational speed because of a very good sound insulation of the motor vehicle, reduced ability to hear and/or diminished driving capacity due to a strong deflection of the accelerator. Upon engaging the clutch, the then very high differential rotational speeds between the input side and the output side of the clutch are noticeable through an unnecessarily high mechanical stress of the clutch disk coating.

The invention is, therefore, based upon the objective of presenting a device as well as a method with which unnecessarily strong wear and tear of the starting and shifting clutch can be avoided by accelerator deflection not adapted to a starting or shifting situation for a representative motor vehicle with a drive motor, a gearshift and a clutch.

SUMMARY OF THE INVENTION

Accordingly, with regard to the device for controlling starting, driving or shifting processes of a motor vehicle, the invention proceeds from the assumption that a drive motor, a gearshift as well as a starting and shifting clutch belong to the power train, by means of which the drive motor and the gearshift can be brought into effective drive connection with each other. Moreover, this motor vehicle has a manually actuatable clutch actuation device as well as a control apparatus which stands in connection with a power element of the same to control the power of the drive motor, and which is connected with sensors using signal engineering which sense the angle of accelerator deflection A, the motor rotational speed C, the transmission input shaft rotational speed E and the transmission output shaft rotational speed G.

With regard to the control device, for realization of the objective posed, it is proposed that the control device has a first calculation module with which a target motor rotational speed value D is calculated for shifting processes as a function of the transmission output shaft rotational speed G and the target gear, toward which the engine rotational speed C is adjusted in such shifting processes; that the control apparatus has a second calculation module with which, outside of shifting processes, when the clutch is slipping, the fuel injection amount B for the drive motor is calculated as a function of the accelerator deflection angle A as well as from the motor rotational speed C and/or the transmission input shaft rotational speed E; and that with a third calculation module, a fuel injection amount B, outside of shifting processes when the clutch is not slipping from a current target fuel injection amount, is adapted to a target fuel injection amount F specified by the driver through the accelerator deflection A.

With such a control device, a clutch friction coating-sparing operation of the clutch can accordingly be guaranteed in any operating situation of a motor vehicle.

With respect to the clutch, in this connection, it can be a manually actuatable clutch or an independently engaging, preferably centrifugal force-actuated clutch whose centrifugal weights are radially deflected during an increase in engine rotational speed, and thus engage the clutch.

It can be provided in a further development of the invention that the control device or the control apparatus is connected through a sensor line with a sensor for recording the actuation position of the clutch so that the various calculation modules mentioned can be activated and deactivated with certainty.

Moreover, the control device can also be connected with a sensor for determination of the rotational speed of the transmission output shaft so that by means of its rotational speed information, it can be concluded with certainty whether the motor vehicle is at a standstill or not for selecting the operating module.

Above and beyond this, the invention includes those variations in which the three operating modules are constructed in an apparatus separate from the control apparatus, whereby the latter is connected with the aforementioned control device using signal engineering. Such an apparatus can, for example, be a transmission control apparatus.

Finally it can be provided with respect to the gearshift that this is constructed as a manually or automatically shiftable gearshift.

The invention also concerns a method for controlling starting, driving and shifting processes of a motor vehicle of the model mentioned above. This method is presently characterized in that a target motor rotational speed D is calculated during shifting processes as a function of the transmission output shaft rotational speed G and the gear to be shifted toward which the motor rotational speed C is adjusted, and in that outside of shifting processes, when the clutch is slipping, the fuel injection amount B is calculated and set for regulating power and rotational speed of the drive motor as a function of the accelerator angle A as well as of the motor rotational speed C and/or the transmission input shaft rotational speed E.

This method makes possible a control of the internal combustion machine that does justice to power requirements, as well as an actuation that reduces wear and tear of the clutch in shifting processes as well as in operating states with slipping clutch. A starting process also belongs to the latter, for example.

If a separate gearshift control apparatus is used, the target motor rotational speeds D calculated for the shifting processes of the transmission or those target motor rotational speeds D which have been formed during starting processes with slippage just as from the accelerator angle A, the motor rotational speed C and/or the transmission input shaft rotational speed E can advantageously be directly transmitted as target rotational speeds to the control device or its calculation modules so that the calculation expenditure for the value of a target-oriented fuel injection amount B suited to demand can be omitted, or at least be diminished in the transmission control apparatus. The aforementioned calculating expenditure is then incumbent upon the manufacturer of the internal combustion engine which uses the control apparatus as a power control apparatus.

This manner of proceeding advantageously allows not exceeding a previously determined motor rotational speed, for example in connection with a starting process from a standstill even with a completely disengaged clutch and full gas position, and thus being able to actuate the clutch and if need be also the synchronization equipment in the gearshift with diminished wear and tear.

In a preferred further development of the method, it is additionally proposed, besides starting and shifting processes when the clutch is not slipping, that the fuel injection amount B of a current value be adapted to a fuel injection amount F specified by the driver through an accelerator deflection A. In this way, the power output of the drive motor takes place during the clutch actuation-free operating time of the motor vehicle directly according to the power specification of the driver.

Furthermore, it is considered advantageous that a target engine rotational speed D depending upon the transmission output shaft rotational speed G be ascertained for a shifting process of the transmission through which the travel speed of the motor vehicle is also taken into consideration.

Moreover, the method is preferably so operated that the target motor rotational speed D is formed depending upon the torque characteristic of the drive motor and/or the gear ratio of the power train as well as the transmission output rotational speed G.

As already indicated in the explanation of the device features of the invention, it is appropriate for differentiating the operating situations of the motor vehicle to ascertain the rotational speed G of the transmission output shaft so that in this way it can be ascertained with certainty whether the vehicle is at a standstill or is already traveling.

Above and beyond this, it is viewed as advantageous if the actuation position of the starting and shifting clutch is ascertained for determining the operating situation of the motor vehicle and is taken into consideration in implementing the method.

Moreover, the regulation of the motor rotational speed C to a target motor rotation speed value D will preferably take place when a clutch slip is ascertained by a comparison of the motor rotational speed with the transmission input shaft motor speed which exceeds a specified slip target value.

With an advantageous refinement of the invention, a gear is only engaged inside shifting processes when the target motor rotational speed D, the motor rotational speed C and the transmission input shaft rotational speed E do not deviate from one another further than a specifiable rotational speed amount.

Preferably this specifiable rotational speed amount is enlarged after introducing the gear engagement.

BRIEF DESCRIPTION OF THE DRAWINGS

The invention will now be described, by way of example, with reference to the accompanying drawings in which:

FIG. 2 is a qualitative time course of various characteristic curves of the power train in accordance with FIG. 1 in connection with a starting process.

DETAILED DESCRIPTION OF THE INVENTION

Figure 1:
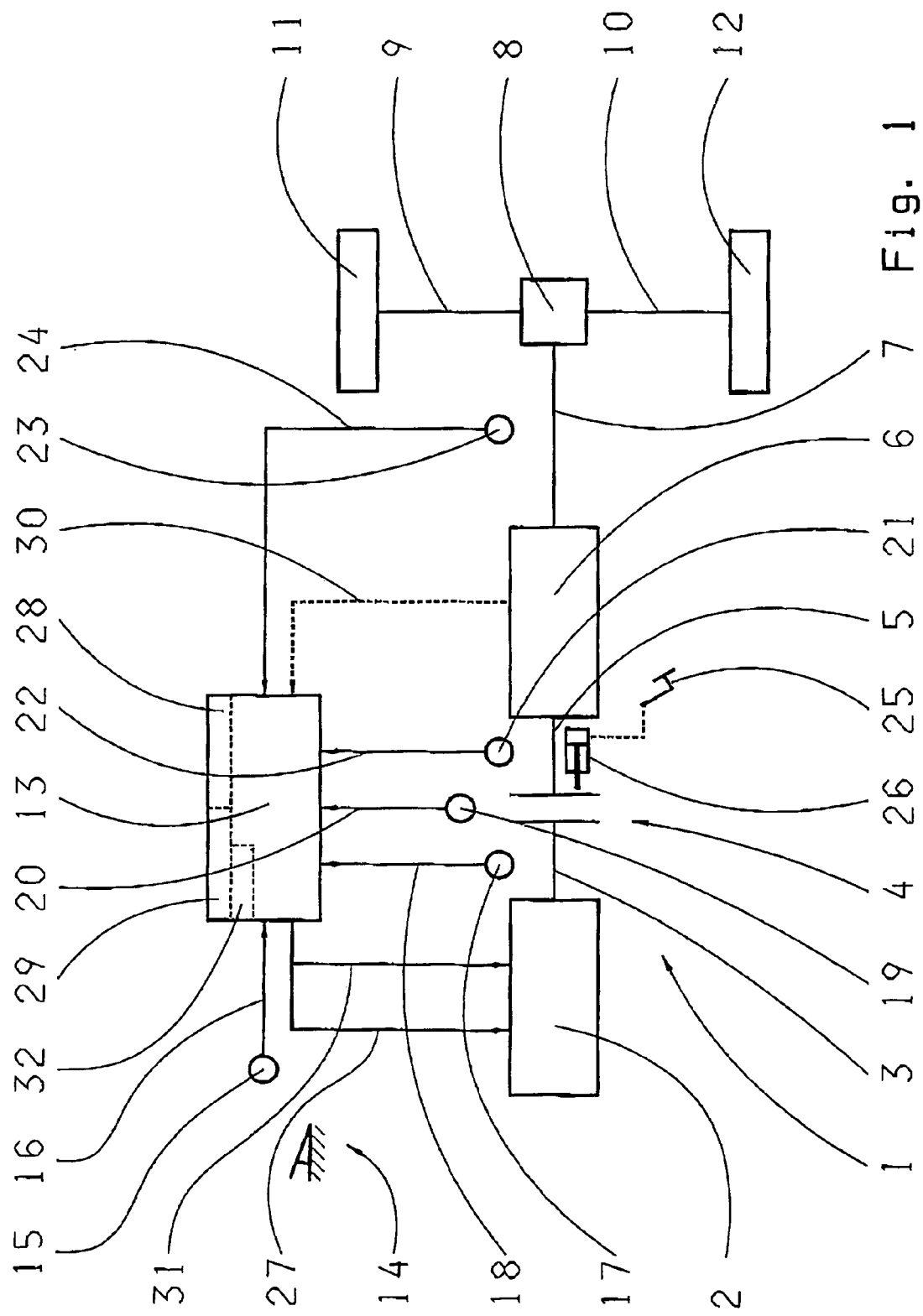
FIG. 1 is a schematic view of a motor vehicle power train.

A power train 1 of a motor vehicle represented in FIG. 1 includes a drive motor 2 constructed as an internal combustion motor which is connected through a crankshaft 3 with a manually actuatable shifting and starting clutch 4. This clutch 4 can also be constructed such that the latter can be engaged independently as a function of centrifugal force by the rotational speed of an input-side component of the same.

The output side of the clutch 3 stands in drive engineering connection with a transmission input shaft 5 of a gearshift 6. The gearshift 6 is constructed as an automatically shiftable transmission whose transmission output shaft 7 drives a differential transmission 8 from which drive shafts 9, 10 leading to the motor vehicle wheels 11, 12 issue.

A control apparatus 13 is allocated to this power train 1 which is constructed here as a motor control apparatus. This motor control apparatus 13 receives a status description through a large number of sensors. A sensor 15 for determining the angle of deflection A of the accelerator, a sensor 17 for recording the motor rotational speed C and a sensor 21 for ascertaining the transmission input shaft rotational speed E belong to the sensors which are important for this invention.

Moreover, the transmission output shaft rotational speed G is ascertained on the transmission output shaft 7 with the aid of a transmission rotational speed output shaft sensor 23 and the clutch actuation position is measured as well with a transmission rotational input shaft sensor 19. The aforementioned sensors 15, 17, 19, 21 and 23 are connected with the control apparatus 13 through sensor lines 16, 18, 20, 22, 24 even if signal transmission can also take place wirelessly.

Besides this, FIG. 1 shows that a clutch pedal 25 is allocated to the power train 1 with which the clutch 4 can be brought into various actuation positions such as "engaged," "disengaged," or "slipping" through a clutch actuation device 26 arranged on the clutch 4.

Finally it is indicated in FIG. 1 through a control line 30 represented in dotted lines that the shift actuation of the automatic gearshift 6 can likewise be controlled by the control apparatus 13 even if a separate transmission control apparatus is usually provided for this purpose.

For realizing the objection posed, it is now provided that the control apparatus 13 has a first calculation module 28 with which a target motor rotational speed D is calculated during shifting as a function of the transmission output shaft rotational speed G and the gear ratio of the gear to be shifted, to which the motor rotational speed C is adjusted. In this way, it is assured in any operating situation of the motor vehicle that no strong clutch wear and tear, triggered by the behavior of the motor vehicle operator, occurs.

In addition to this, this control apparatus 13 has a second calculation module 29 with which a target fuel injection amount B is set directly as a function of the accelerator angle A, the motor rotational speed C and/or the transmission input shaft rotational speed E for regulating the motor power and motor rotational speed outside of shifting processes.

A third calculation module 32 becomes active outside of shifting processes when the clutch is not slipping and adapts the applicable fuel injection amount B to a target fuel injection amount F just specified by the motor vehicle driver. This specification takes place, for example, through the deflection of the accelerator by accelerator pedal angle A and is preferably used during the driving operation phase without clutch actuation.

As is illustrated by control lines 27, 31, the control apparatus 13 stands in signal engineering connection with the power element of the drive motor 2 so that, as a function of the aforementioned operating situations, the drive motor 2 is adjusted to the target motor rotational speed D depending upon the measured motor rotational speed C, the measured transmission output shaft rotational speed G and/or the transmission input shaft rotational speed E, or only those starting and shifting, relevant motor rotational speeds are allowed which lead to the desired wear and tear-free operation of the clutch 4. The aforementioned power element is formed in the present example by the fuel injection valve of the drive motor.

The qualitative course over time of some power train parameters important in this connection is represented in FIG. 2 for a starting process. Here the accelerator is deflected up to the stop by the motor vehicle driver beginning from time $t_r$ and held in this position in the further course which becomes clear through the steep rise and then constant value of the accelerator deflection angle. Without the regulatory intervention of the invention, the motor rotational speed C would follow this presently unacceptable power demand so that a rotational speed difference between the input side (crankshaft 3) and the output side (transmission input shaft 5) of the clutch 4, which would strongly exert wear and tear on the friction coating of the clutch, would exist for engaging in this starting process.

To avoid this damaging effect, the invention provides with respect to method that an optimal target motor rotational speed D is calculated for this starting process toward which the motor rotational speed C is adjusted. The measured deflection angle A of an accelerator 14, the motor rotational speed C and/or the transmission input shaft rotational speed E enter into the calculation of this motor rotational speed. Preferably the torque characteristics of the drive motor 2 and the primary shift gear reduction ratio 6 can also be considered.

Accordingly, the fuel injection signal (curve B) is triggered between points in time $t_1$ and $t_2$ caused by the accelerator deflection A, in accordance with which fuel is injected into its combustion chamber through the aforementioned fuel injection valves. As soon as the motor rotational speed D is present in the form of a first intermediate value at time $t_2$, the admission of fuel to the drive motor 2 is stopped. The motor rotational speed C has, likewise up until then, reached an intermediate value which lies barely below the value of the motor rotational speed D which is present from time $t_3$ on.

From this point in time $t_3$ on, the motor rotational speed C is adjusted to the now constant value of the target motor rotational speed D so that from this point in time on, fuel is again admitted to the drive motor 2 according to the chronological sequence of the fuel injection amount B, in order to avoid a speed undershoot. The required fuel amount rises continuously during following chronological sequence.

By this point in time $t_4$ the clutch 4 begins to transmit torque which becomes clear through the rise of the transmission input shaft rotational speed E.

The clutch 4 transmits torque at first only slippingly from time $t_4$ on, during the clutch closing process until this is completely closed at time $t_5$ and the transmission input shaft rotational speed E has reached the value of motor rotational speed C.

If the complete deflection of the accelerator 14 (curve A) continues further, the fuel injection amount B is further increased after time $t_5$ in consequence of which the motor rotational speed C rises further, owing to which a speedy start is guaranteed.

A similar curve course is also to be noted in connection with shifting processes on gearshift 6. Nonetheless the target motor rotational speed D is then formed by the transmission output shaft rotational speed G and the gear ratio of the gear of the traveling motor vehicle to be shifted to which the current motor rotational speed C is adjusted.

Accordingly, FIG. 2 also makes clear that in starting processes, a motor rotational speed D is calculated as a function of the measured accelerator deflection angle A to which the motor rotational speed C is adjusted. In this way, it is avoided in such operating situation that strongly wear and tear-promoting motor rotational speeds and therewith differential rotational speeds between the input and the output side of the clutch 4 arise through impetuous accelerator deflection. Outside and inside shifting processes, the motor rotational speed C is regulated directly by specifying the target fuel injection amount. If the fuel injection amount F specified by the driver is attained in the slip-free phase of the clutch during adaptation of the fuel injection amount B, influencing the fuel injection amount B can be shut off. The drive motor 2 then receives the fuel injection amount F. Once again, if slippage is subsequently recognized on the clutch, the fuel injection amount B is fed to the drive motor 2 to set the motor rotational speed D on the drive motor 2.

REFERENCE NUMBERS 1 power train
2 internal combustion motor, drive motor
3 crankshaft, drive shaft
4 shifting and starting clutch
5 transmission input shaft
6 gearshift
7 transmission output shaft
8 differential transmission
9 drive shaft
10 drive shaft
11 motor vehicle wheel
12 motor vehicle wheel
13 control apparatus
14 accelerator
15 accelerator sensor
16 sensor line
17 motor rotational speed sensor
18 sensor line
19 sensor transmission input shaft rotational speed
20 sensor line
21 sensor for clutch position
22 sensor line
23 sensor transmission output shaft rotational speed
24 sensor line
25 clutch pedal
26 clutch actuation device
27 control line
28 calculation module (shifting)
29 calculation module (no shifting and slipping)
30 control line
31 control line
32 calculation module
A accelerator deflection angle
B fuel injection amount (calculated)
C motor rotational speed
D target motor rotational speed
E transmission input shaft rotational speed
F target fuel injection amount (specified by accelerator deflection angle a)
G transmission output shaft rotational speed

The invention claimed is:

1. A device for controlling at least one of a starting process, a driving process and a shifting process of a motor vehicle having a drive motor (2), a gearshift (6) and a starting and shifting clutch (4), with the drive motor (2) drivingly connected with the gearshift (6) via the starting and shifting clutch (4) and a clutch actuation device (25, 26), a control apparatus (13) communicates with a power adjusting element for controlling output of the drive motor (2) and is connected with sensors (14, 17, 19, 21) by sensor lines, the sensors (14, 17, 19, 21) sensing an accelerator deflection angle (A), a motor rotation speed (C) and a transmission input shaft rotational speed (E), the control apparatus (13) has a first calculation module (28) which calculates a target motor rotational speed value (D) as a function of a transmission output shaft rotational speed (G) and a gear to be shifted, toward which the motor rotational speed (C) is adjusted in connection with such shifting process; the control apparatus (13) has a second calculation module (29) with which, when the clutch (4) is slipping, a fuel injection amount (B) for the drive motor (2) is calculated as a function of the accelerator deflection angle (A) as well as at least one of the motor rotational speed (C) and the transmission input shaft rotational speed (E); and a third control module (32), outside of the shifting process when the clutch (4) is not slipping, the fuel injection amount (B) of a current fuel injection amount value is adapted to a target fuel injection amount (F) specified by a driver through the accelerator deflection angle (A).

2. The device according to claim 1, wherein the clutch (4) is an independently closing, centrifugally actuated clutch.

3. The device according to claim 1, wherein the control apparatus (13) is connected with a sensor (21) for recording an actuation position of the clutch (4).

4. The device according to claim 1, wherein the first, the second and the third calculation modules (28, 29, 32) are separate devices, and each of the separate devices is connected with the control apparatus (13) through signal cabling.

5. The device according to claim 1, wherein the control apparatus (13) is connected with a sensor (23) for determining the rotational speed (G) of the transmission output shaft (7).

6. The device according to claim 1, wherein the gearshift (6) is an automatic transmission.

7. A method for controlling at least one of a starting process, a driving process and a shifting process of a motor vehicle, the method comprising the steps of:
  calculating a target motor rotational value (D) as a function of a transmission output shaft rotational speed (G) and a gear to be shifted;
  adjusting a motor rotational speed (C) to the target motor rotational value (D); and
  setting the fuel injection amount (B) for a drive motor (2) as a function of an accelerator deflection angle (A) as well as at least one of the motor rotational speed (C) and a transmission input shaft rotational speed (E), when the clutch (4) is slipping.

8. The method according to claim 7, further comprising the step of outside of the shifting process, when the clutch (4) is not slipping, adapting the fuel injection amount (B) of a current value to a target fuel injection amount (F) specified by a driver through the accelerator deflection angle (A).

9. The method according to claim 7, further comprising the step of calculating the target motor rotation value (D) on a basis of the accelerator deflection angle (A) and the motor rotational speed (C).

10. The method according to claim 7, further comprising the step of determining the motor rotational speed (D) from at least one of a torque characteristic of the drive motor (2), a reduction in speed of the power train (1) and the transmission output rotational speed (G).

11. The method according to claim 7, further comprising the step of ascertaining the rotational speed (G) of the transmission output shaft (7) for determining an operating situation of the motor vehicle.

12. The method according to claim 7, further comprising the step of ascertaining the actuation position of the clutch (4) for determination of an operating situation.

13. The method according to claim 7, further comprising the step of setting the motor rotational speed (C) when a clutch slippage is ascertained on the clutch (4) which exceeds a specified target slipping value.

14. The method according to claim 7, further comprising the step of outside of the shifting process, engaging a gear only when the target motor rotational speed (D), the motor rotation speed (C) and a transmission input shaft rotational speed (F) do not deviate from one another further than a specifiable rotational speed amount.

15. The method according to claim 14, further comprising the step of the increasing the specifiable rotational speed amount after introducing gear engagement.

* * * * *